(12) United States Patent
Manwaring et al.

(10) Patent No.: US 7,434,840 B2
(45) Date of Patent: Oct. 14, 2008

(54) TELLTALE INDICATOR FOR ADAPTIVE ENERGY ABSORBING SYSTEM

(75) Inventors: Marvin V. Manwaring, Clio, MI (US); Richard K. Riefe, Saginaw, MI (US); Ray G. Armstrong, Bay City, MI (US); Lee M. Tinnin, Clio, MI (US); Ravindra Jwalapathy, Saginaw, MI (US); Robert L. Stearns, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 526 days.

(21) Appl. No.: 11/141,893

(22) Filed: Jun. 1, 2005

(65) Prior Publication Data

US 2005/0263996 A1 Dec. 1, 2005

(51) Int. Cl.
*B62D 1/19* (2006.01)
(52) U.S. Cl. .......................... 280/777; 280/775; 74/493
(58) Field of Classification Search ................. 280/775, 280/777; 74/492, 493
See application file for complete search history.

(56) References Cited

U.S. PATENT DOCUMENTS

| | | | | |
|---|---|---|---|---|
| 4,892,330 A | * | 1/1990 | Beauch | 280/775 |
| 5,221,154 A | * | 6/1993 | Foulquier et al. | 403/12 |
| 6,234,528 B1 | * | 5/2001 | Ben-Rhouma et al. | 280/777 |
| 6,764,098 B2 | * | 7/2004 | Matsumoto et al. | 280/777 |
| 6,769,715 B2 | * | 8/2004 | Riefe et al. | 280/777 |
| 7,025,380 B2 | * | 4/2006 | Arihara | 280/775 |
| 7,219,927 B2 | * | 5/2007 | Lee | 280/777 |
| 2002/0024210 A1 | * | 2/2002 | Nomura et al. | 280/777 |
| 2002/0167157 A1 | * | 11/2002 | Matsumoto et al. | 280/777 |
| 2004/0099083 A1 | * | 5/2004 | Choi et al. | 74/492 |
| 2006/0033321 A1 | * | 2/2006 | Manwaring et al. | 280/777 |
| 2006/0049621 A1 | * | 3/2006 | Lee | 280/777 |
| 2007/0039403 A1 | * | 2/2007 | Manwaring et al. | 74/492 |

* cited by examiner

*Primary Examiner*—Toan To
*Assistant Examiner*—Barry Gooden, Jr.
(74) *Attorney, Agent, or Firm*—Michael D. Smith

(57) ABSTRACT

A steering column assembly includes a steering column having a selectively collapsible structure that enables said column to collapse in the event of an impact force resulting from a vehicle crash. An adaptive energy absorbing device is associated with said column and operates in a first condition to absorb a first level of energy of the collapsing column and in a second condition to absorb a second level of energy of the collapsing column. The assembly includes a telltale detection device that is associated with the adaptive energy absorbing device and is responsive to a change in condition of the energy absorbing device prior to a collapse event to provide a signal to a user of the condition of the energy absorbing device.

19 Claims, 7 Drawing Sheets

TELLTALE INDICATOR FOR ADAPTIVE ENERGY ABSORBING SYSTEM

BACKGROUND OF THE INVENTION

This invention relates generally to steering column assemblies for automotive vehicles, and more particularly to such assemblies fitted with energy absorbing devices which are operative to absorb kinetic energy in response to collapse of a steering column in the event of a crash.

Steering column assemblies for automotive vehicles are known to be equipped with various energy absorbing ("EA") devices which serve to absorb kinetic energy of a collapsing column in the event of a crash. In a sudden frontal impact situation, there are conditions under which the driver may be thrown forward against the steering column, particularly if the driver is unbelted. Many steering columns are designed to collapse under such conditions. EA devices are designed to cooperate with collapse of the column in order to absorb a certain amount of the kinetic energy of the collapse in an effort to alleviate the full force of impact to the driver.

Depending upon various factors, the requirements of the EA device may differ. For example, a situation in which a very heavy driver is seated far away from the steering wheel and is unbelted would call for greater energy absorption on the part of the EA device than would that required in a situation involving a very light occupant seated closer to the steering wheel. Various parameters have been taken into account in the design and manufacture of so-called adaptive EA systems, which measure one or more parameters and then make adjustments in the EA system prior to impact to increase, decrease or in some way alter the behavior of the EA system in the event of a crash. For example, in the heavy, unbelted driver situation above, the EA system could react by adjusting the number, position or size of an anvil(s) across which one or more EA straps are drawn in order to increase the amount of energy absorbed in a crash to accommodate the relatively greater forces from such a driver, as compared to a lighter driver where the reverse may be done. This ability to adapt to various parameters can help manage the absorption and dissipation of the energy of the collapsing column when impacted by the driver. Such adaptable EA systems are able to adjust their energy absorption characteristics by altering the position or configuration of the energy absorbing components. For example, an EA device may be fitted with an S-strap routed about two anvils in a pre-set condition to provide a high level of energy absorption, but may be adjusted by sliding one of the anvils out of the way of the path of the S-strap in order to provide a relatively lower energy absorption condition. Other arrangements employ multiple straps, wires, and other arrangements which can be altered in arrangement, quantity, or configuration in order to adjust the energy absorbing characteristics. The known adaptive EA systems are constructed such that the movable anvil or other components which get altered when the device adapts to a changing condition are all contained within a closed housing of the EA system and thus it is not readily apparent upon external inspection of the EA device which of two or more positions of adjustment it may be in. For example, the EA device in which an S-shaped EA strap is initially wrapped about two anvils but adjustable to eliminate one of the anvils and thereby reduce the energy absorbing characteristics of the EA system does not provide a means of telling which position the movable anvil is in at the time the device is installed in the vehicle and during the service life of the vehicle. In the event the device is inadvertently moved to the second position, such as if the vehicle is involved in a collision sufficient to activate the adaptive system, and the operator continues to use the vehicle without repairing or replacing the EA device, the full performance of the device may be diminished.

It is an object of the present invention to provide a means of telling which position an adaptable EA device is in at any given time during its service life.

SUMMARY OF THE INVENTION AND ADVANTAGES

According to a first aspect of the invention, a telltale system is provided for adaptive EA devices which cooperates with the changeable portion of the EA device and provides a discernable indicator that can be seen or sensed by a mechanic or user to indicate the condition of the EA device.

According to a further aspect of the invention, the indicating device is in the form of an indicator pin or flag which, upon movement of the EA device from one condition to another, is sprung outwardly of the EA housing to provide a visible indication that the EA device has moved from one condition to another. The flagging feature can take on any of a number of forms, such as a button that pops out, a flag that extends up, a window that changes color, etc. provided it functions indicate a change in condition and which can be seen by a mechanic or user.

The invention has the advantage of providing a means of enabling a mechanical user to determine which condition an adaptable EA device is in without having to disassemble the device. This is particularly advantageous in the event, for example, that the EA device is dropped or somehow tampered with prior to installation or during the service life or involved in an accident which may cause the EA device to shift from one condition to another. For example, if the EA system were preset to handle heavy loads and the device was inadvertently adjusted to the low load condition, the EA device may be less able to accommodate the heavy load condition in the event of a crash. Similarly, if the vehicle were involved in a frontal crash situation and the vehicle were to be repaired, a mechanic could look to the visible indicator device to determine whether the EA system changed its condition as indicated by the projecting button or upstanding flag, or whether the EA system remains in its original pre-set condition and can continue in service.

According to another aspect of the invention, a sensor is provided on an adaptive EA system which senses a change in condition and then sends an alarm signal to alert the driver and/or mechanic that the condition of the EA device is changed. For example, the sensor can be wired to light up the air bag warning light, check engine light, or its own EA warning light on the instrument panel, or could further operate to disable operation of the vehicle until the problem is corrected. The electronic signaling device can work in conjunction with or separate from the mechanical telltale system above. Such an electronic system has the additional advantage of providing the indicator feature in clear view of the driver and which can be associated with other common warning signals which would encourage drivers to have their vehicles serviced so that the problem can be corrected.

THE DRAWINGS

Other advantages of the present invention will be readily appreciated as the same becomes better understood by reference to the following detailed description when considered in connection with the accompanying drawings wherein.

DETAILED DESCRIPTION

The present invention is directed to collapsible steering columns outfitted with adaptive energy absorption (EA) systems which are movable in a manner to adjust the energy absorption characteristics of the EA system in response to the collapse of the column. One type of adaptive EA system is shown as being exemplary of any of a number of adaptive EA devices which are adjustable or moveable from one position to another in order to adjust the energy absorption characteristics of the EA system. A telltale device is shown associated with the adaptive EA system and is operative in response to movement of the adaptive EA system from one position to another to provide external indication of the repositioning of the EA device that is visible by a mechanic and/or the driver of the vehicle to indicate a need to service the vehicle, and particularly the adaptive EA system. It is contemplated that those skilled in the art will appreciate that the telltale device can be readily adapted to work with any of the various adaptive EA systems presently available or to be developed which are capable of moving from one position to another, and which movement can trigger activation of a telltale device to indicate a change of position to a mechanic or user. Accordingly, the embodiments disclosed below are merely exemplarily of the invention.

Figure 1:
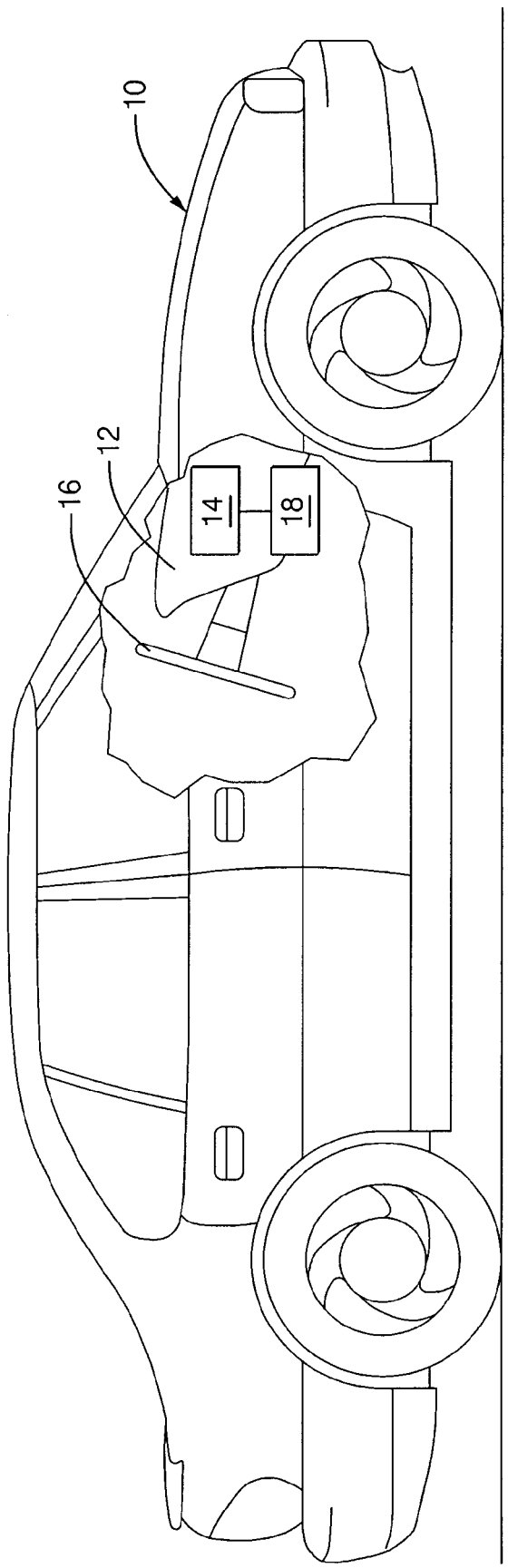
FIG. 1 is a dramatic elevation view of the vehicle, shown partially broken away, equipped with a steering column having an adaptive EA system and telltale device according to the invention.

FIG. 1 is a schematic representation of an automotive vehicle 10 equipped with a collapsible steering column assembly 12 of the type which is normally rigidly mounted to the vehicle structure and held against forward movement in the vehicle (apart from normal telescopic movement of the hand wheel if the column is so equipped) but which, when subjected to impact from a frontal collision, separates from the vehicle structure enabling the column to move forward in the vehicle to minimize injury to the driver in the event the driver strikes the steering wheel. The steering column assembly 12 is equipped with an adaptive EA device, schematically illustrated at 14, which operates to absorb at least some of the kinetic energy of the collapse of the column to minimize the impact force to the driver.

The steering column 12 is equipped with a conventional steering wheel 16 or other hand operated steering controller to enable the driver to steer the vehicle 10 with the column 12. The EA device 14 is operatively coupled to a telltale device schematically shown at 18 in FIG. 1 which is operative to react in response to a change in condition of the adaptive EA device 14 and provide a means of indicating the condition to the driver or a mechanic.

Figure 2:
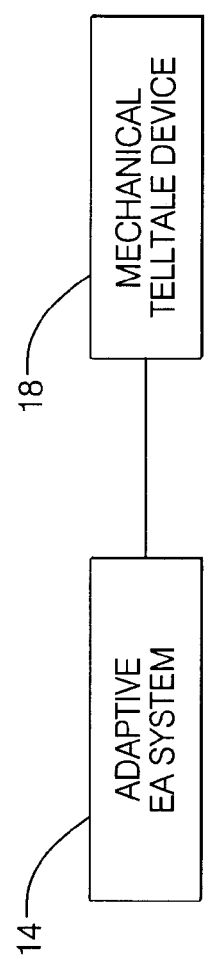
FIG. 2 is a diagrammatic view of an adaptive EA system and mechanical telltale device according to a first embodiment of the invention.

Referring additionally to FIG. 2, according to the first embodiment of the invention, the telltale device 18 is a mechanical device, the details of the preferred embodiment of which are further illustrated in FIGS. 3-8. Effectively, the mechanical telltale device 18 provides some physical indicator that a change in the position of the EA sensor has occurred from an initial preset position. Those skilled in the art will appreciate that such a telltale device may take on any of a number of forms once the concept is appreciated. For example, the disclosed embodiment shows a telltale device in which a button protrudes from the adaptive EA device 14 when the EA device 14 moves from its initial pre-set position to a second position, which button can be visibly detected and/or felt by the operator or mechanic upon an external examination of the adaptive EA device 14.

Figure 3:
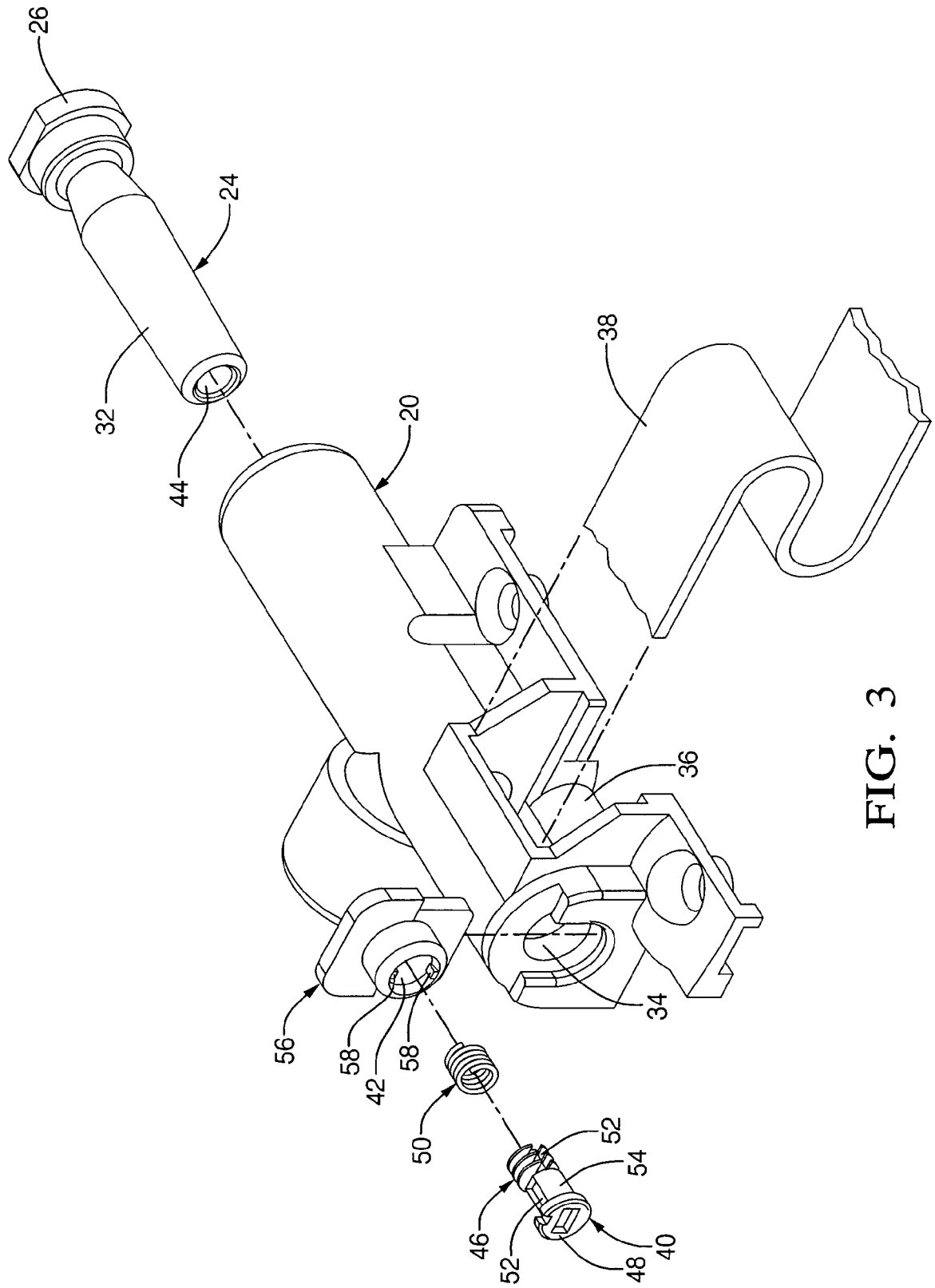
FIG. 3 is an exploded perspective view of the adaptive EA system and telltale device constructed according to a presently preferred embodiment of the invention.
Figure 7:
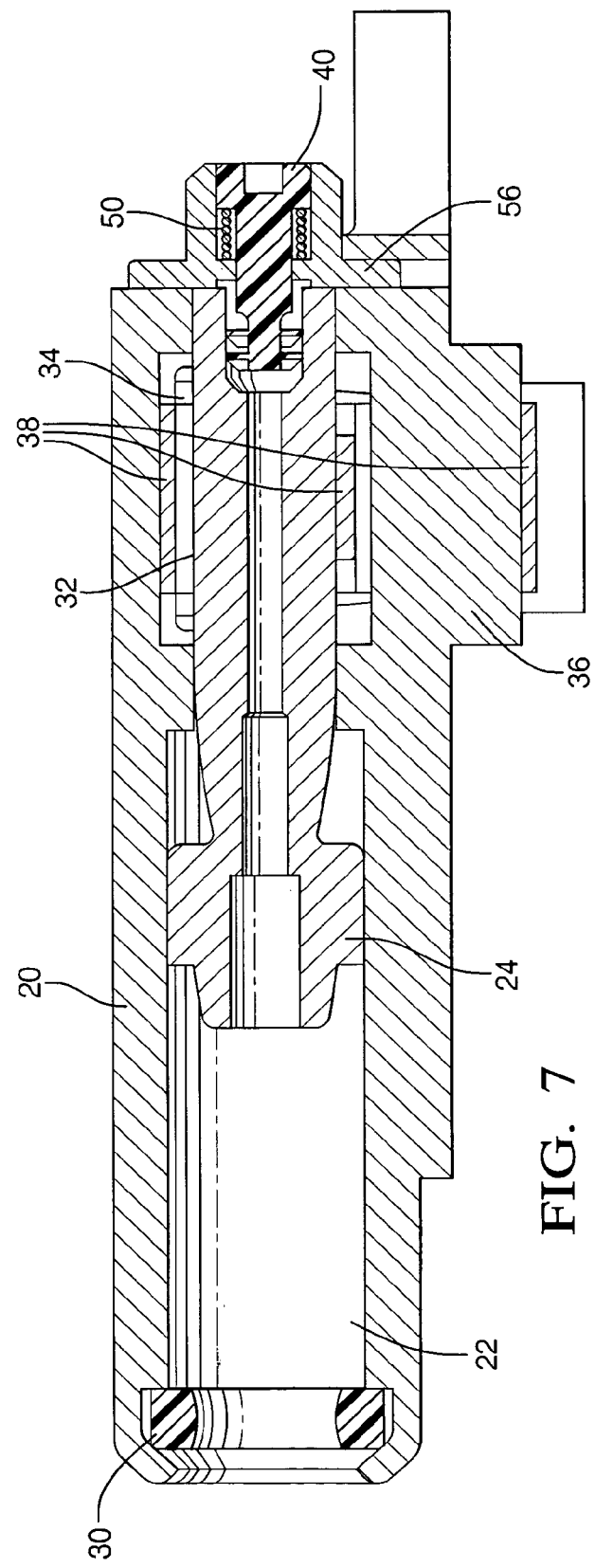
FIG. 7 is a cross-sectional view through the adaptive EA system and telltale device with the pin shown in the installed first conditional.
Figure 8:
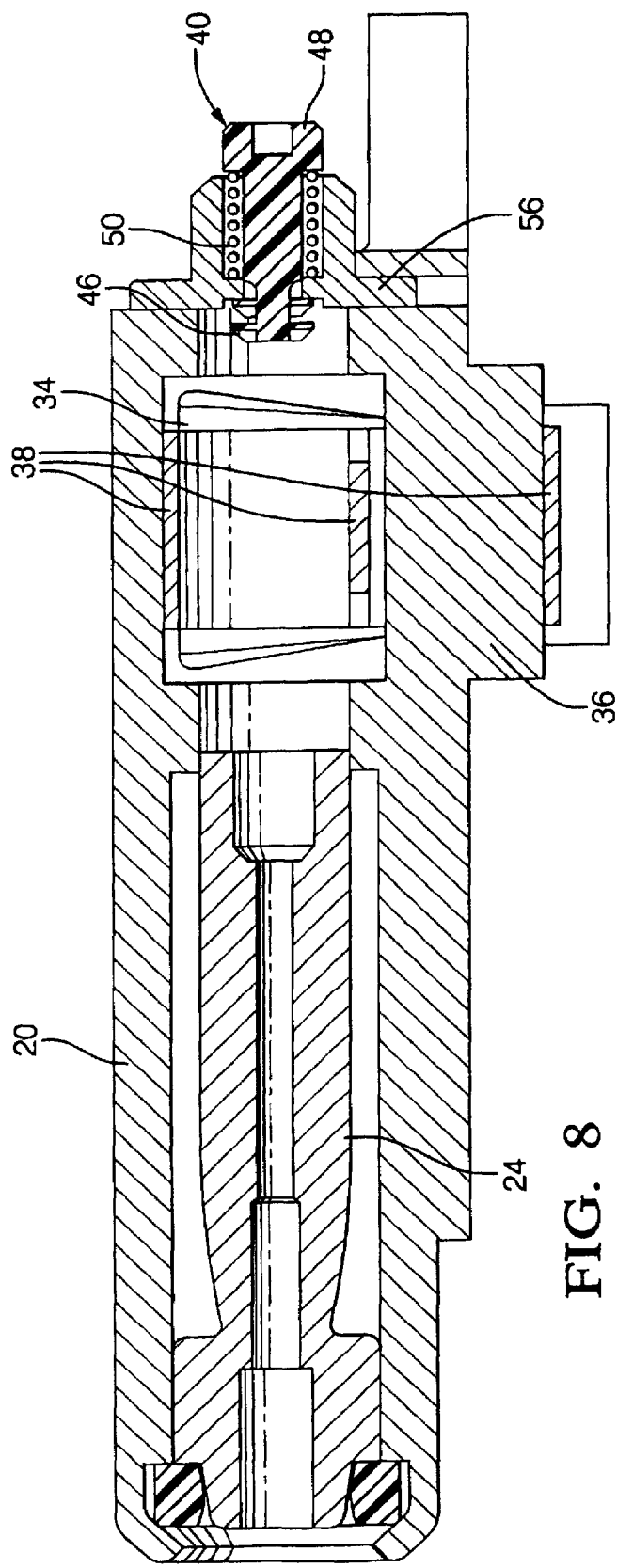
FIG. 8 is a view like FIG. 7, but showing the EA pin and telltale device to a second position in response to the EA pin.
Figure 9:
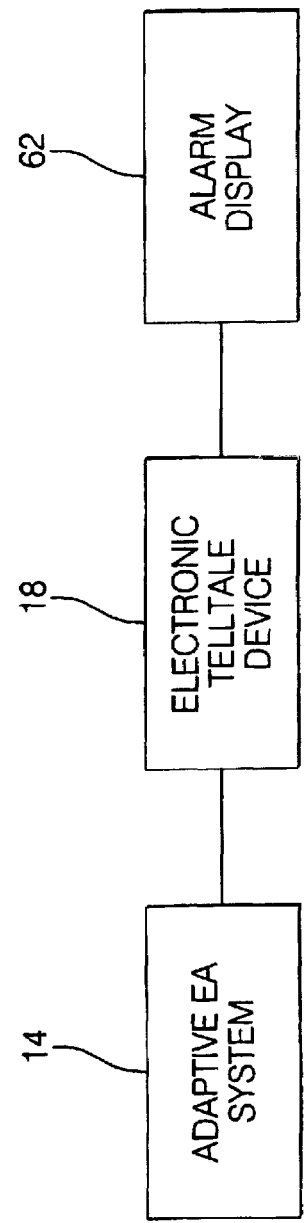
FIG. 9 is a diagrammatic view of an adaptive EA system and electronic telltale device constructed according to a second embodiment of the invention.

FIG. 3 illustrates an exploded perspective view of the EA device 14 and telltale device 18. The EA device includes an EA housing 20 having cylindrical bore or chamber 22 in which an adaptive EA anvil or pin 24 is accommodated. The housing 20 is mountable on the column 12 and may be either stationary or moveable with respect to the collapse movement of the column. FIGS. 7 and 8 show further features of the EA device 14 and telltale device 18 when in the assembled condition, and further illustrate the adaptive pin 24 being moveable between a first pre-set position shown in FIG. 7, and a second position illustrated in FIG. 8 in which the pin has been moved to a second position.

The pin 24 is slidable in the cylinder bore 22 between the first set position shown in FIG. 7 and the second position shown in FIG. 8. The movement is preferably driven by an explosive charge (not shown) which explodes in the cylinder bore 22 behind a head 26 of the pin, driving it toward the end 28 of the chamber where it strikes and is captured by a retaining ring 30 such that the pin 24 does not bounce back toward the first position once fired. The principle of explosive moveable pin devices are well know to those of ordinary skill in the art and thus will not be expounded upon here.

When the first position of FIG. 7, and anvil portion 32 of the pin projects though a strap passage 34 which is an extension of the cylinder bore 22 adjacent a second fixed anvil or pin 36. An S-strap 38 is routed through the passage 34 and around the fixed pin 36 in position to engage both the fixed pin 36 and the adaptive pin 24 to provide a first level of energy absorption. When the pin 24 is fired to the second position of FIG. 8, the anvil portion 32 moves out of the path of the S-strap 38, such that only the fixed pin 36 is engaged by the strap 38 during collapse of the column, representing a lessor energy absorption condition than that of the initial condition of FIG. 7. During collapse, the strap 38 is drawn across one or both anvils and is cause to bend and unbend along the S-shaped path to absorb kinetic energy. By eliminating the adaptive pin 24 as in FIG. 8, one of the anvils is eliminated and thus the S-strap absorbs less energy than in the first condition of FIG. 7.

The telltale device 18 comprises a pin or plug 40 which extends through an opening 42 into the end chamber 28 and fits into an opening or bore 44 and in the end of the adaptive pin 24 when the pin 24 is first condition of FIG. 7. The plug 40 is inserted with a friction fit into the bore 44 by means of a flexible end 46 comprising a series of axial spaced flexible annular flanges 47 which engage and are radially compressed by the walls of the bore (i.e., sometimes referred to as a "Christmas tree"-type fitting) and is made of a plastics material, such as nylon or the like. The opposite end of the plug 40 is formed with an enlarged head 48 which is received in the opening 42 of the housing 20 when in the fully installed condition, as in FIG. 7, against the compression force of the spring 50 acting to constantly urge the head 48 axially outwardly of the opening against the frictional retaining force of the flexible end 46 within the bore 44. The plug 40 is formed with an axial slot 52 that extends axially along the flexible end portion 46 for a distance and then continues along a shank 54 of the plug 40 between the head 48 and flexible end 46 and an angularly offset (preferably 90° offset) orientation to that of the slot along the flexible end portion 46.

Figure 5:
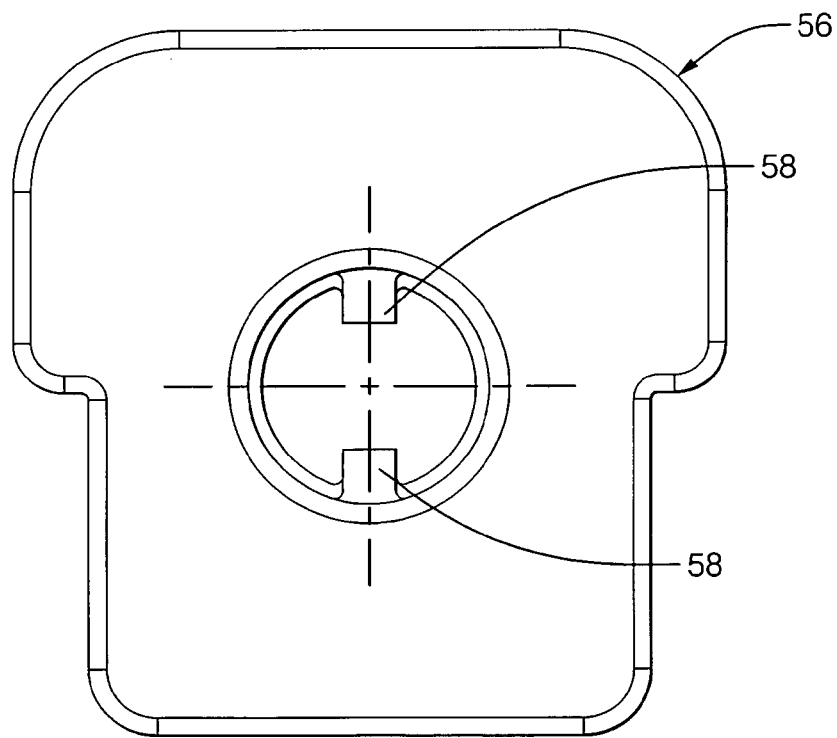
FIG. 5 is an enlarged elevation view of a closeout member of the telltale device.

The opening 42 of the EA device 14 is fitted with a closeout device or member 56 shown best in FIG. 5 which fits into the housing 20 and is provided with diametrically opposed projections 58. The plug 40 is inserted into the closeout device 56 with the projections 58 received in the slots 52 and guided along the flexible end portion 46, and then turned 90° and further guided along the slot 52 extending along the shank 54 as the flexible end 46 is forcibly guided into the bore 44 of the adaptive pin 24 where it is retained in the position shown in FIG. 7 against the outward spring force of spring 50. When in the fully recessed position, the plug 40 serves as a telltale device to indicate that the adaptive pin 24 is in the first position shown in FIG. 7.

Figure 4:
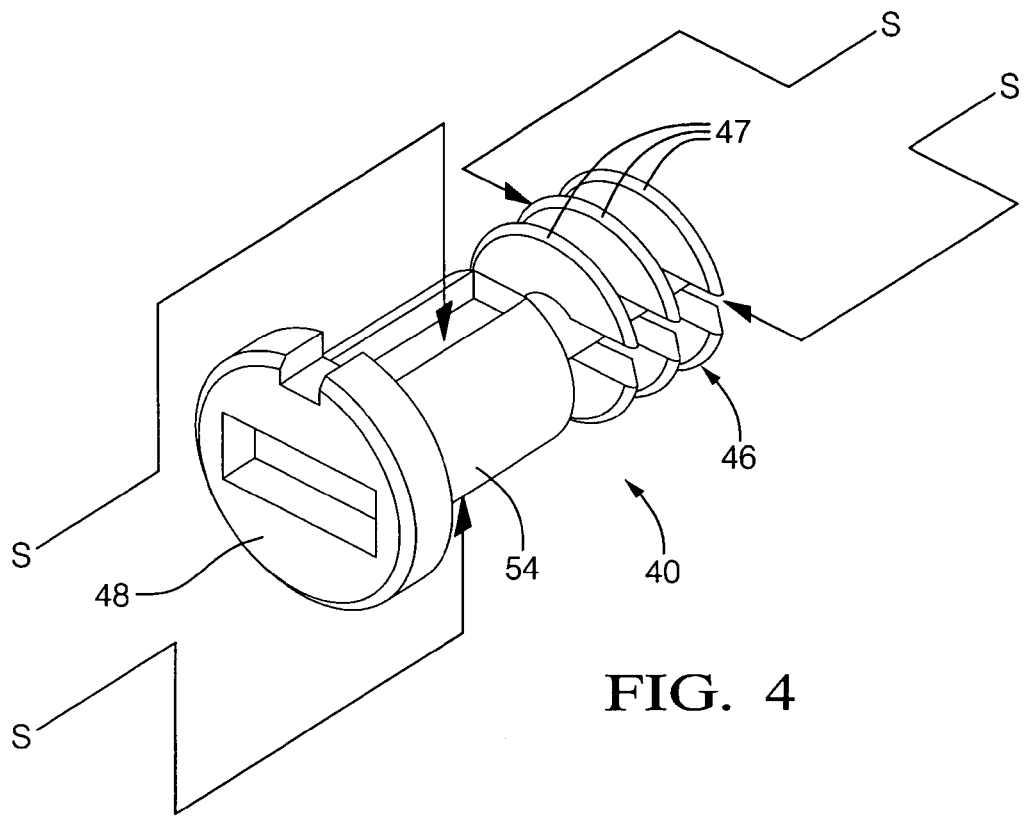
FIG. 4 is an enlarged perspective view of a pin retainer of the telltale device.
Figure 6:
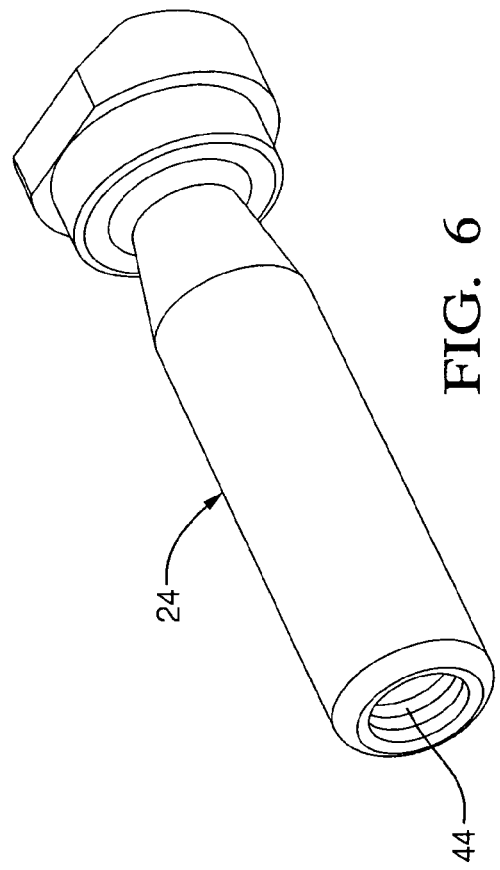
FIG. 6 is a perspective view of the anvil pin having an alternative threaded hole end.

In the event that the pin 24 moves to the second position either under the explosive force or inadvertently as a result of being dropped or improperly assembled, or the like, the pin 24 is then spaced from the flexible end 46 of the plug 40 such that there is no longer any frictional force holding back the outward biasing force exerted by the spring 50. Consequently, the spring 50 forces the head 48 of the plug 40 outwardly of the opening 42, thereby giving a telltale signal that the pin 24 is in the second position of FIG. 8. With the offset slot arrangement, the plug 40 is prevented from being completely ejected under the action of the spring 50. As the projections 58 travel along the slot 52 of the shank 54, they eventually confront the flexible end portion 46 of the plug at the point where the slot 52 transitions to the 90° offset and is no longer in line with the projections. FIG. 4 shows details of the construction of the telltale plug 40, and FIG. 6 shows an alternative threaded end bore 44 design of the adaptive pin 24, which can be used in lieu of the straight bore to enhance gripping of the plug 40.

Preferably, at least the head 48 of the telltale plug 40 is brightly colored (e.g., red) such that it is readily visible when extending from the opening 42 when in the second condition corresponding with FIG. 8. When a mechanic or user sees the head 48 projecting from the opening 42, it is an indication that the adaptive pin 24 is moved from its initial first position of FIG. 7 to the second position of FIG. 8 and that the vehicle may need servicing.

Figure 10:
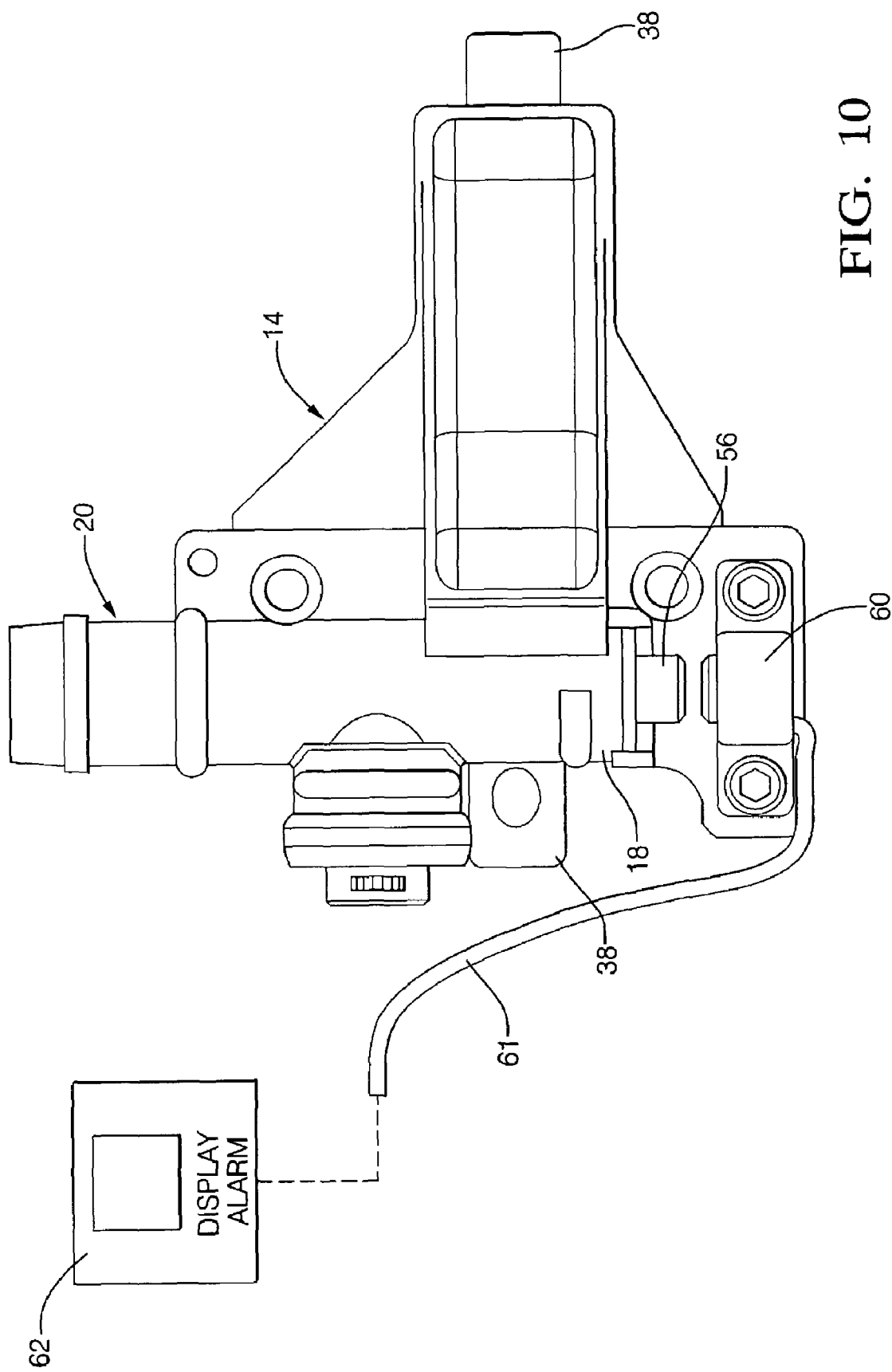
FIG. 10 is a plan view of an adaptive EA system and telltale device according to the second embodiment with the EA pin shown in the installed first position.
Figure 11:
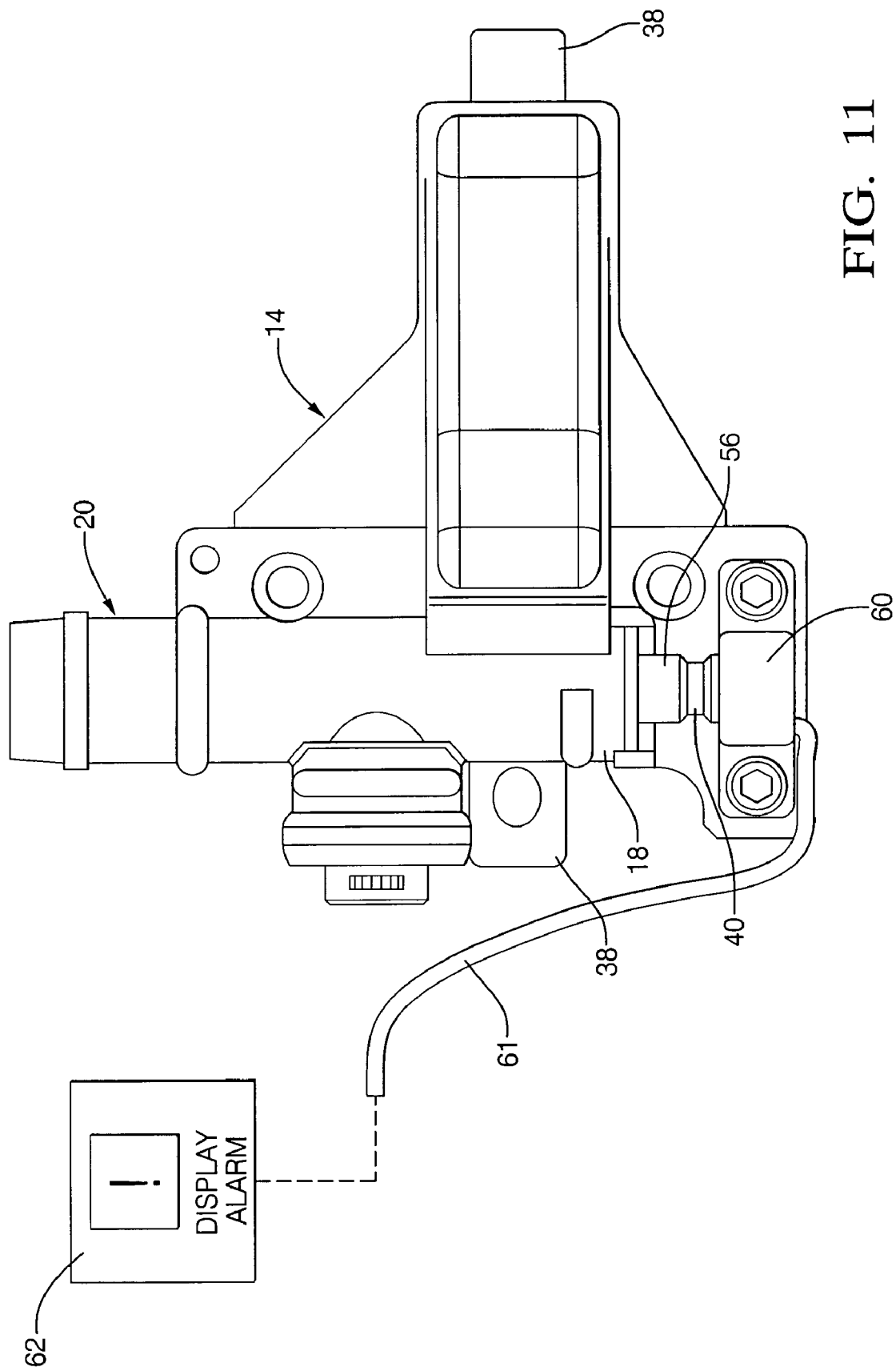
FIG. 11 is a view like FIG. 10 but with the EA pin and telltale device shown moved to the second position.

FIGS. 10 and 11 illustrate a further embodiment in the invention, in which the telltale device is at least, in part, an electronic device which sends a signal to the user or mechanic that the adaptive pin 24 has moved from a first condition to a second condition. According to the preferred embodiment, the telltale device of the second embodiment is identical in all respects to the first embodiment, except that a sensor 60 is positioned adjacent the opening 42 of the housing 20 and is engaged by or at least senses the movement of the head 48 of the plug 40 as it advances out of the opening 42 in response to movement of the adaptive pin 24 from the first position to the second position. As shown in FIG. 11, the head 48 preferably extends from the opening 42 and contacts the sensor 60, which in turn processes the information and activate a display/alarm 62, which can take on the form of a warning light on the instrument panel, such as "check engine", "air bag", "EA system", etc., which would alert the driver to the fact that the adaptive EA pin has moved from the first position to the second position and to take the vehicle in for service.

In addition to or as alternative, the sensor 60 could cooperate with the ignition system or other vehicle control system to disable operation of the vehicle if the vehicle manufacturer deems it significant enough to warrant disablement of the vehicle until the condition is corrected. Of course, those skilled in the art will appreciate that the electronic telltale device may not necessarily need the mechanical component of the first embodiment, but could simply have a sensor that senses the movement of the adaptive pin 24 from the first position to the second then activates a signal.

Obviously, many modifications and variations of the present invention are possible in light of the above teachings. It is, therefore, to be understood that within the scope of the appended claims, the invention may be practice otherwise than as specifically described.

What is claimed is:

1. A steering column assembly for a vehicle, comprising:
    a steering column having a selectively collapsible structure that enables said column to collapse in the event of an impact force resulting from a vehicle crash;
    an adaptive energy absorbing device associated with said column which operates in a first condition to absorb a first level of energy of the collapsing column and in a second condition to absorb a second level of energy of the collapsing column;
    a telltale detection device associated with said adaptive energy absorbing device and responsive to a change in condition of said energy absorbing device prior to a collapse event to provide a signal to a user of the condition of said energy absorbing device; and
    said telltale detection device including an electronic device that senses said condition of said adaptive energy absorbing device and generates said signal to the user corresponding to said condition.

2. The assembly of claim 1 wherein said telltale detection device comprises a mechanical member moveable between a first position to indicate the first condition of said energy absorbing device and a second position to indicate the second condition of the energy absorbing device.

3. The assembly of claim 1 wherein said telltale detection device includes a button that is held in a retracted position in response to the energy absorbing device being in said first condition and is moveable to an extended position in response to said energy absorbing device being in said second condition.

4. The assembly of claim 3 wherein said energy absorbing device includes an anvil and an energy-absorbing strap that is moveable along a path in the event of a crash.

5. The assembly of claim 4 wherein said anvil is moveable between a first position corresponding to said first condition of said energy absorbing device in which at least a portion of said anvil is positioned in the path of said strap to confront said strap during movement of said strap in a collapse event, and a second position in which said at least a portion of said anvil is positioned out of said path of said strap so as not to confront said strap during a collapse event.

6. The assembly of claim 4 wherein said button is releasably coupled to said anvil.

7. The assembly of claim 6 wherein said anvil is slidable between first and second positions.

8. The assembly of claim 7 wherein said button uncouples from said anvil in response to movement of said anvil from said first position to said second position.

9. The assembly of claim 4 wherein said entire anvil is moved completely out of the path of said strap when in said second position.

10. The assembly of claim 4 wherein said energy absorbing device includes at least a second anvil positioned in said path of said strap.

11. The assembly of claim 10 wherein said second anvil is fixed in position.

12. The assembly of claim 3 wherein said telltale detection device includes a position sensor.

13. The assembly of claim 12 wherein said position sensor is disposed adjacent said button and is operative to detect the movement of said button to said extended position and generate a corresponding electrical signal.

14. The assembly of claim 13 wherein said button contacts said sensor when in said extended position.

15. A steering column assembly for a vehicle, comprising:
a steering column having a selectively collapsible structure that enables said column to collapse in the event of an impact force resulting from a vehicle crash;
an adaptive energy absorbing device associated with said column which operates in a first condition to absorb a first level of energy of the collapsing column or in a second condition to absorb a second level of energy of the collapsing column;
said energy absorbing device includes an anvil which is slidable between first and second positions and an energy-absorbing strap that is moveable along a path in the event of a crash;
a telltale detection device associated with said adaptive energy absorbing device and responsive to a change in condition of said energy absorbing device prior to a collapse event to provide a signal to a user of the condition of said energy absorbing device;
said telltale detection device includes a button that is releasably coupled to said anvil and held in a retracted position in response to the energy absorbing device being in said first condition and moveable to an extended position in response to said energy absorbing device being in said second condition;
said button uncouples from said anvil in response to movement of said anvil from said first position to said second position; and wherein
said button is spring-biased toward said extended position such that when said button uncouples from said anvil it is moved to said extended position.

16. The assembly of claim 15 wherein said energy absorbing device includes a housing having an opening in which said button is slidably received.

17. The assembly of claim 16 wherein said button projects outward of said housing when in said second position to provide a visible means of detecting the corresponding position of said anvil external to said housing.

18. The assembly of claim 16 wherein said button is retained in said housing from removal in response to movement from said first retracted position to said extended position.

19. A steering column assembly for a vehicle, comprising:
a steering column having a selectively collapsible structure that enables said column to collapse in the event of an impact force resulting from a vehicle crash;
an energy absorbing device associated with said column having a housing, a pin disposed within said housing, and an energy absorbing strap disposed along a path through said housing;
said pin slidable within said housing between an engaged position in which said strap is engaged with said pin for absorbing a first level of energy during a collapse of said column and a disengaged position in which said strap is disengaged from said pin for absorbing a second level of energy during the collapse of said column;
a plug supported by said housing and movable between a first position and a second position;
said plug coupled to said pin in said first position when said pin is disposed in said engaged position and decoupled from said pin and protruding at least partially outside said housing when said pin is disposed in said disengaged position such that a user may assess the position of said pin based on viewing said position of said plug; and,
a spring operatively connected to said plug to bias said plug towards said second position such that said plug moves towards said second position when decoupled from said pin.

* * * * *